UNITED STATES PATENT OFFICE.

BENJAMIN JONES, OF CLEVELAND, OHIO.

MOLD AND PROCESS OF MAKING SAME.

SPECIFICATION forming part of Letters Patent No. 510,865, dated December 12, 1893.

Application filed January 21, 1893. Renewed November 14, 1893. Serial No. 490,964. (No specimens.)

*To all whom it may concern:*

Be it known that I, BENJAMIN JONES, of Cleveland, in the county of Cuyahoga and State of Ohio, have invented certain new and useful Improvements in Molds, Mold-Facings, and Cores and Processes of Making the Same; and I do hereby declare the following to be a full, clear, and exact description of the invention, such as will enable others skilled in the art to which it pertains to make and use the same.

My invention relates to improvements in cores, molds and mold-facings for the manufacture of steel and other metallic castings, and in the process of making same, the object being to produce a core, mold or mold-facing capable of withstanding the intense heat had in the manufacture of such castings, and that will shrink approximately with the casting in cooling and will cleave readily from the casting, and whereby a casting whose surface is perfectly smooth and free from scoria, &c., may be obtained.

My improved core, mold or mold-facing is made preferably as follows:—Take five parts of clean strong sand, such, for instance, as molding sand, to one part of a suitable combustible substance, preferably flour, and thoroughly mix the same while dry. The core, mold or mold-facing is built up of said compound, the latter of course being dampened and tempered suitable for the purpose. The proportions of sand and combustible substance or material used in making the compound may be varied more or less according to circumstances, but I would advise the use of too much rather than too little sand.

The surfaces of the core, mold or mold-facing, after being built up as hereinbefore described, is then coated with a wash composed as follows:—Take one pound of sal ammoniac and dissolve the same in one gallon of hot, preferably boiling hot water. Take five parts by weight of silica sand, ground fine, and mix the same dry with one part by weight of plumbago. Then mix the silica sand and plumbago mixture with the sal ammoniac water aforesaid to reduce the mass to the consistency of a wash. The mold or core is then coated with said wash and smoothed down and allowed to dry slowly. The wash penetrates the core, mold or mold-facing for perhaps one-half inch, more or less.

The core, mold or mold-facing having been built up and coated as hereinbefore described, a binding and hardening substance or composition, preferably coal-tar, is introduced so as to form one compound with the sand and flour or combustible substance of the material of which the core, mold or mold-facing is composed. This introduction of the coal-tar or binding and hardening substance is effected by applying the same while in a hot liquid condition to the surface of the core, mold or mold-facing until the mold, core or mold-facing has become thoroughly impregnated with it and its gases, the core, mold or mold-facing being thoroughly dried and heated preparatory to the introduction of the binding and hardening substance. It may be said that the binding and hardening substance is burned into the core, mold or mold-facing. If all the gases in the tar or binding and hardening substance were retained therein disastrous results would likely ensue in the operation of casting, but by introducing it, as hereinbefore described, by burning the same into the core, mold or mold-facing, enough of said gases is eliminated to avoid such results.

A core, mold or mold-facing composed as hereinbefore described presents a smooth hard surface and will not only withstand the intense heat had in the manufacture of steel-castings but will shrink with the casting in cooling owing to the consumption or burning, upon the operation of casting, of the flour or combustible substance or material in the composition of the core, mold or mold-facing, and will readily cleave from the casting.

I would here remark that I prefer to have the core, mold or mold-facing saturated with the binding and hardening substance, so that the core, mold or mold-facing shall be as solid as practicable.

What I claim is—

1. A mold, mold-facing or core having its body composed of a compound of sand and a suitable combustible substance coated with a wash of sal ammoniac, silica and plumbago, and impregnated or saturated with a binding and hardening substance or composition, substantially as set forth.

2. A mold, mold-facing or core, having its body composed of a compound consisting of sand and flour coated with a wash of sal ammoniac, silica and plumbago and impregnated or saturated with coal tar, substantially as set forth.

3. The process herein described of making molds, mold-facings and cores consisting in building up the core, mold or mold-facing, of a compound composed of sand and a suitable combustible substance or material, then coating the same with a wash composed of sal ammoniac, silica and plumbago, and then impregnating or saturating the same with a binding or hardening substance, substantially as set forth.

4. The process herein described of making molds, mold-facings and cores, consisting in building up the core, mold or mold-facing of a compound composed of sand and flour in approximately the proportions specified, then coating the same with a wash of sal ammoniac, silica and pumbago, and lastly impregnating or saturating the same with hot liquid coal-tar, substantially as set forth.

In testimony whereof I sign this specification, in the presence of two witnesses, this 4th day of January, 1893.

BENJAMIN JONES.

Witnesses:
C. H. DORER,
WARD HOOVER.